(12) United States Patent
Li et al.

(10) Patent No.: US 10,564,359 B2
(45) Date of Patent: Feb. 18, 2020

(54) OPTICAL INTERCONNECT APPARATUS

(71) Applicants: Jinghui Li, Sierra Madre, CA (US); Yuan Liu, Shenzhen (CN); Haiquan Zhang, Shenzhen (CN); Xiaodong Huang, Shenzhen (CN)

(72) Inventors: Jinghui Li, Sierra Madre, CA (US); Yuan Liu, Shenzhen (CN); Haiquan Zhang, Shenzhen (CN); Xiaodong Huang, Shenzhen (CN)

(73) Assignee: Auxora (Shenzhen) Inc., Shenzhen (CN)

( * ) Notice: Subject to any disclaimer, the term of this patent is extended or adjusted under 35 U.S.C. 154(b) by 0 days.

(21) Appl. No.: 15/732,563

(22) Filed: Jan. 4, 2018

(65) Prior Publication Data

US 2019/0204510 A1 Jul. 4, 2019

(51) Int. Cl.
G02B 6/293 (2006.01)
H04J 14/02 (2006.01)
G02B 6/42 (2006.01)
G02B 6/38 (2006.01)

(52) U.S. Cl.
CPC ......... *G02B 6/2938* (2013.01); *G02B 6/4285* (2013.01); *H04J 14/0278* (2013.01); *G02B 6/3897* (2013.01)

(58) Field of Classification Search
CPC .................................................. G02B 6/2938
See application file for complete search history.

(56) References Cited

U.S. PATENT DOCUMENTS

| 5,487,120 | A | * | 1/1996 | Choy | H04B 10/506 |
| | | | | | 385/24 |
| 6,025,944 | A | | 2/2000 | Mendez | |
| 6,229,938 | B1 | | 5/2001 | Hibino | |
| 6,536,957 | B1 | | 3/2003 | Buchter | |
| 6,563,614 | B1 | * | 5/2003 | Stephens | H04B 10/0775 |
| | | | | | 398/136 |
| 7,308,006 | B1 | | 12/2007 | Banerjee | |
| 7,452,140 | B2 | | 11/2008 | Ito | |
| 9,134,494 | B2 | | 9/2015 | Wang | |
| 9,146,367 | B2 | | 9/2015 | Kalogerakis | |
| 9,354,397 | B2 | | 5/2016 | Bylander | |

(Continued)

OTHER PUBLICATIONS

Non-final Office Action dated Jul. 30, 2018 for U.S. Appl. No. 15/732,559, pp. 1-6.

(Continued)

*Primary Examiner* — Sung H Pak
*Assistant Examiner* — Hoang Q Tran

(57) ABSTRACT

Embodiment of present invention provide an optical interconnect apparatus. The apparatus includes an optical signal path; a first set of pigtail fibers attached to a first end of the optical signal path via a first wavelength-division-multiplexing (WDM) filter; and a second set of pigtail fibers attached to a second end of the optical signal path via a second WDM filter. Embodiment of present invention further provide an interconnected optical system that includes a first optical transport terminal having a first set of optical signal ports and a second optical transport terminal having a second set of optical signal ports, with the two sets of optical signal ports being interconnected by the optical interconnect apparatus.

17 Claims, 5 Drawing Sheets

(56) References Cited

U.S. PATENT DOCUMENTS

| | | | |
|---|---|---|---|
| 2002/0009266 A1* | 1/2002 | Zdinak | G01J 3/18 |
| | | | 385/55 |
| 2002/0163688 A1 | 11/2002 | Zhu | |
| 2004/0008927 A1* | 1/2004 | Kowalkowski | G02B 6/4249 |
| | | | 385/24 |
| 2004/0208542 A1 | 10/2004 | Peddanarappagari | |
| 2004/0218875 A1 | 11/2004 | Lemoff | |
| 2007/0101242 A1 | 5/2007 | Yancey | |
| 2009/0196617 A1* | 8/2009 | Yoshizaki | G02B 6/4246 |
| | | | 398/82 |
| 2013/0148984 A1* | 6/2013 | Kalogerakis | H04B 10/50 |
| | | | 398/200 |
| 2014/0248052 A1* | 9/2014 | Li | H04J 14/04 |
| | | | 398/44 |
| 2016/0004020 A1* | 1/2016 | Shao | G02B 6/4246 |
| | | | 385/24 |

OTHER PUBLICATIONS

Final Office Action dated Apr. 18, 2019 for U.S. Appl. No. 15/732,559, pp. 1-7.

* cited by examiner

OPTICAL INTERCONNECT APPARATUS

CROSS-REFERENCE TO RELATED APPLICATION

The present application is related to U.S. patent application titled "Optical Interconnect Apparatus and System", having a filing date of Nov. 27, 2017 and a Ser. No. 15/732,559.

FIELD OF THE INVENTION

The present invention relates generally to structure of optical device and configuration of optical system in optical signal transportation and, in particular, relates to an apparatus for optical signal interconnect.

BACKGROUND

Wavelength-division-multiplexing (WDM) is a key enabling technology in today's high speed digital communication infrastructure that supports vast amount of data transportation which in turn is essential for many data centric informational applications such as, for example, many internet based applications. The transportation of vast amount of data are made via optical digital signals over an extensive optical fiber network across the country or global and such optical signals, riding on different wavelengths (or "colors"), are distributed and/or re-distributed among various parts or branches of the optical network via signal exchanges located at various data centers and other facilities. Sometimes, such signal distribution and/or re-distribution may also involve conversion of signals from optical to electric, and then from electric to optical, in terms of its carrying media.

When optical signals are distributed and/or re-distributed within an optical network, it often involves interconnecting optical signals from one signal handling unit, which may be, for example, an optical signal transponder installed in a shelf hosted by a rack ("bay"), to another signal handling unit which may be located in a same room, in a different room of a same floor, or sometimes in a different floor. FIG. 10 is a demonstrative illustration of an interconnected optical system 900 as is known in the art. System 900 is simplistically illustrated to include a first bay 910 and a second bay 920 located, for example, in a same room of a building. Bay 910 may include, from top to bottom, multiple shelfs such as shelf 911, with each of the shelfs having multiple optical signal transponders.

An optical signal coming from an optical signal transponder located in bay 910 may be connected to another optical signal transponder located in bay 920 via a piece of fiber 902, which may have connectors 901 and 903 at its two ends connecting to the signal transponders. Multiple optical signals from bay 910 may need to be connected to multiple destinations in bay 920, and vise versus, using multiple pieces of fibers. Generally the number of fibers needed equals to the number of optical signals being interconnected between the bays, which is demonstratively illustrated in FIG. 10 by a second piece of fiber 904 and the "dots" in between which represents the existence of many more fibers between bay 910 and bay 920.

With the ever increasing data rate, in particular rapid deployment of WDM technology, the number of optical signals of different wavelengths that need to be interconnected between different bays, and sometimes between different shelfs in a same bay, has increased dramatically resulting in the explosive use of fibers in signal interconnection. FIG. 11 is an exemplary picture of a traditional optical system 990 where optical signal interconnect among the bays are provided by an enormous stack of individual pieces of fibers 991 which, like cooked spaghetti, are usually "dumped" at the backside of the various bays.

SUMMARY

It becomes apparent to the applicants of present invention that, with an interconnected optical system like the one 990 shown in FIG. 11, fiber management is a major concern when it comes to, among others, performing system maintenance, reliability assurance of signal traffic, and troubleshooting when, for example, there is a fiber cut.

Embodiments of present invention provide an optical interconnect apparatus. The apparatus includes an optical signal path; a first set of pigtail fibers attached to a first end of the optical signal path via a first wavelength-division-multiplexing (WDM) filter; and a second set of pigtail fibers attached to a second end of the optical signal path via a second WDM filter.

In one embodiment, the optical signal path is a single continuous optical fiber cable from the first end to the second end. In another embodiment, the optical signal path includes at least two pigtail fibers coming of the first and second WDM filters respectively, with the two pigtail fibers being connectorized at their other respective ends, and connected together through an optical adaptor thereby forming the optical signal path. In yet another embodiment, the optical signal path includes three or more optical fibers, each of the three or more optical fibers being connectorized and connected in a series to form the optical signal path.

In one embodiment, at least one of the first and second ends of the optical signal path is connected to one of the corresponding first and second WDM filters through an optical adaptor. In another embodiment, at least one of the first and second ends of the optical signal path is pigtailed from one of the corresponding first and second WDM filters.

In one embodiment, the first set of pigtail fibers includes at least 4 individual pigtail fibers that are adapted to accommodate four optical signals of four different wavelengths respectively. In another embodiment, the first set of pigtail fibers includes at least 8 individual pigtail fibers. In yet another embodiment, the first set of pigtail fibers includes more than 8 individual fibers. The first and second set of pigtail fibers includes the same number of pigtail fibers.

In one embodiment, the first set of pigtail fibers are stacked together and mounted on one side of the first WDM filter. In another embodiment, the first set of pigtail fibers and the first end of the optical signal path are at a same side of the first WFM filter.

According to one embodiment, an optical signal of a first wavelength propagating from a corresponding first pigtail fiber via the first WDM filter to the optical signal path experiences less than 0.5 dB total insertion loss. According to another embodiment, the first WDM filter has a cross-sectional area that is less than ten times a size of the first set of pigtail fibers being stacked together, in a direction vertical to the stacking.

Embodiment of present invention provide an interconnected optical system. The system includes a first optical transport terminal having a first set of optical transponders with a first set of corresponding optical signal ports; a second optical transport terminal having a second set of optical transponders with a second set of corresponding optical signal ports; and an optical signal path connecting the first set of optical signal ports with the second set of optical signal ports, wherein the first set of optical signal ports are connected to a first end of the optical signal path via a first act of pigtail fibers attached to a first wavelength-division-multiplexing (WDM) filter, and the second set of optical signal ports are connected to a second end of the optical signal path via a second set of pigtail fibers attached to a second WDM filter.

BRIEF DESCRIPTION OF THE DRAWINGS

The present invention will be understood and appreciated more fully from the following detailed description of embodiments of the invention, taken in conjunction with accompanying drawings of which.

Figure 1:
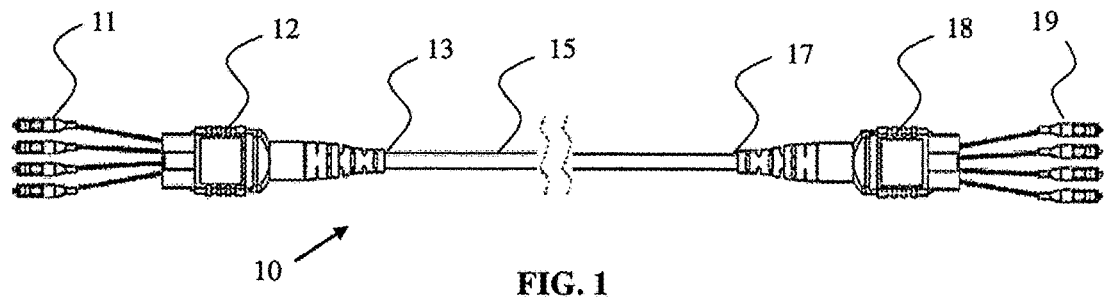
FIG. 1 is a demonstrative illustration of an optical interconnect apparatus according to one embodiment of present invention.

It will be appreciated that for simplicity and clarity purpose, elements shown in the drawings have not necessarily been drawn to scale. Further, in various functional block diagrams, two connected devices and/or elements may not necessarily be illustrated to be connected, for example, by a continuous solid line or dashed line but rather sometimes a small gap between two lines extended from the two devices and/or elements may be inserted intentionally in order to illustrate the individual devices and/or elements even though their connection is implied. In some other instances, grouping of certain elements in a functional block diagram may be solely for the purpose of description and may not necessarily imply that they are in a single physical entity or they are embodied in a single physical entity.

DETAILED DESCRIPTION OF PREFERRED EMBODIMENTS

FIG. 1 is a demonstrative illustration of an optical interconnect apparatus according to one embodiment of present invention. More specifically, optical interconnect apparatus 10 may include an optical signal path 15, a first set of pigtail fibers 11 coming out of a first WDM filter 12 that is attached to a first end 13 of optical signal path 15. Optical interconnect apparatus 10 may additionally include a second set of pigtail fibers 19 coming out of a second WDM filter 18 that is attached to a second end 17 of optical signal path 15.

Throughout this application and unless specific stated otherwise, the term "fiber" is used to refer to a fiber cable that, in addition to a "bare" fiber that normally includes only a fiber core and one or more layers of cladding around the core, generally also includes some protection jacket surrounding the "bare" fiber for strength and ease of handling of the fiber. Similarly, the term "pigtail fiber" is used to refer to a fiber cable terminated at or pigtailed to another device or generally object, unless specifically stated otherwise.

First set of pigtail fibers 11 may include multiple pigtail fibers, all terminated at or pigtailed to first WDM filter 12. In one embodiment, one or more of the other respective ends of the set of pigtail fibers may be connectorized to include any suitable type of connectors such as LC, SC, FC, ST, or MT-RJ connectors. Typically, the number of pigtail fibers may range from 2 to 8, preferably from 4 to 8, although embodiment of present invention are not limited in this aspect and a number larger than 8, in terms the number of pigtail fibers, is fully contemplated as well and is considered fully within the spirit of present invention.

Each pigtail fiber is capable of carrying an optical signal of a distinct wavelength, with the wavelength being arranged or designated according to industry standard. All of the optical signals coming from first set of pigtail fibers 11 are combined inside first WDM filter 12 into a composite WDM optical signal and subsequently coupled into optical signal path 15 via the first end 13 thereof. Being a bidirectional optical device, a composite WDM optical signal coming from optical signal path 15, in a reverse direction, may be launched into first WDM filter 12 via the first end 13, and be subsequently divided or separated into multiple optical signals of distinct wavelengths, with each being coupled into its corresponding pigtail fibers by first WDM filter 12. In a further embodiment, the composite WDM optical signal may include a plurality of single wavelength optical signals traveling in both directions. An optical signal of a distinct wavelength propagating from a corresponding pigtail fiber of first set of pigtail fibers 11 via first WDM filter 12 to optical signal path 15 may experience less than 0.5 dB total insertion loss, and in one embodiment less than 0.2 dB total insertion loss.

In one embodiment, optical signal path 15 maybe a single piece of optical fiber capable of carrying WDM optical signals. In another embodiment, optical signal path 15 may be two or more optical fibers connected in series via various connectors. The fiber or fibers making up optical signal path 15 are fiber cables and not "bare" fibers. One or both of the first end 13 and the second end 17 of optical signal path 15 may be pigtailed to first WDM filter 12 and/or second WDM filter 18. However, embodiment of present invention are not limited in this aspect. For example, one or both ends of optical signal path 15 may be connected, instead of pigtailed, to first WDM filter 12 and/or second WDM filter 18 via suitable connectors including LC, SC, FC, ST, or MT-RJ type connectors.

Second set of pigtail fibers 19, similar to first set of pigtail fibers 11, maybe terminated at or pigtailed to second WDM filter 18 and may include a number of pigtail fibers that equals to the number of pigtail fibers in first set of pigtail fibers 11. Moreover, second set of pigtail fibers 19 may be capable of carrying a set of optical signals of distinct wavelengths, decided by second WDM filter 18, which corresponds to the set of optical signals that may be carried by first set of pigtail fibers 11, decided by first WDM filter 12. In other words, first WDM filter 12 and second WDM filter 18 preferably have matching wavelength-dependent functionalities. Similar to first set of pigtail fibers 11, second set of pigtail fibers 19 may be connectorized to have connectors at their respective ends, and the pigtail fibers are pigtail fiber cables.

Figure 2:
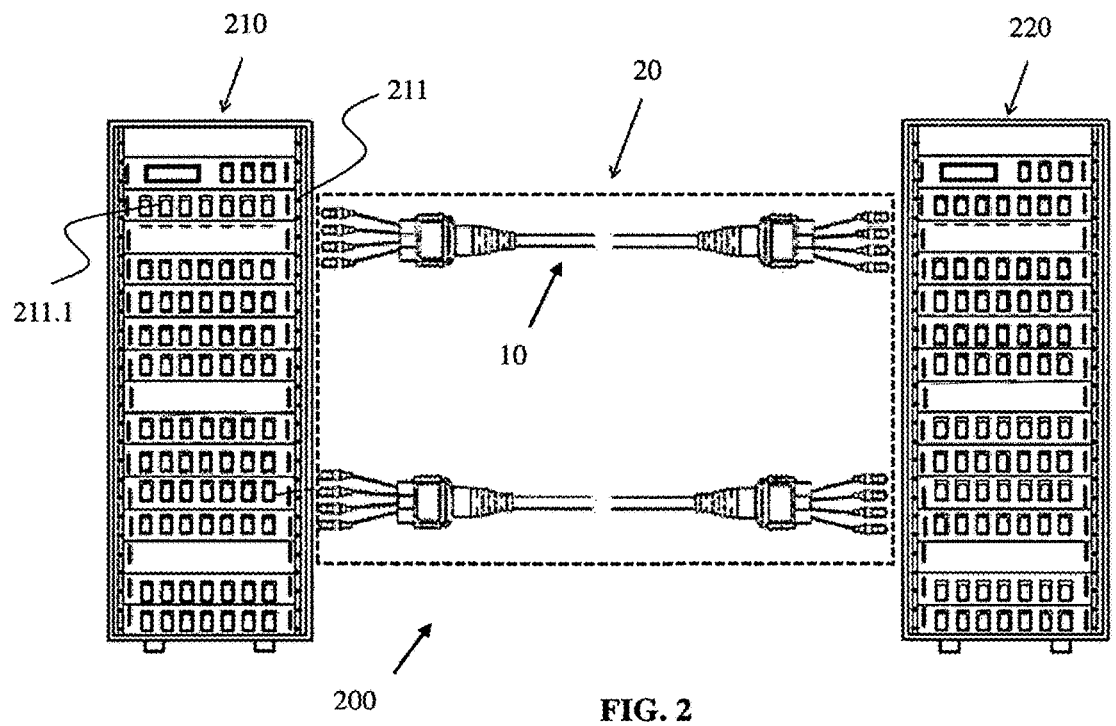
FIG. 2 is a demonstrative illustration of an interconnected optical system where optical signal interconnect is provided by optical interconnect apparatus according to embodiment of presented invention.

FIG. 2 is a demonstrative illustration of an interconnected optical system where optical interconnect is provided by one or more optical interconnect apparatus according to embodiment of presented invention. More specifically, in FIG. 2 optical system 200 is demonstratively illustrated to include a first bay 210 and a second bay 220 that may be located, for example, in a same room, in different rooms or in different floors. Bay 210 may include multiple shelfs, such as shelf 211, each of which may include multiple optical transponders, such as transponder 211.1. Several optical signals, sometimes a significant number of optical signals, coming from several optical transponders located in bay 210 may be connected to their corresponding optical transponders located in bay 220 via an optical interconnect apparatus 20. Optical interconnect apparatus 20 may be an optical interconnect apparatus 10 as being demonstratively illustrated in FIG. 1 according to one embodiment of present invention. However, embodiment of present invention are not limited in this aspect and other optical interconnect apparatus or optical assemblies or interconnect kits, such as those demonstratively illustrated in FIGS. 3-7 below, may be used as well, and may be used in connection with an optical signal path.

Using optical interconnect apparatus 10 illustrated in FIG. 1 as an example for the below description of FIG. 2, without losing the generic nature and essential spirit of present invention, multiple optical transponders in bay 210, in a same shelf or different shelfs, may be connected to first set of pigtail fibers 11 of optical interconnect apparatus 10. With first set of pigtail fibers 11, optical interconnect apparatus 10 may be able to accommodate, for example, 4 to 8 or even more number of optical transponders. Similarly at the second end of optical signal path 15, a similar (4 to 8 or even more) number of corresponding optical transponders may be connected to second set of pigtail fibers 19 of optical interconnect apparatus 10.

During operation, multiple optical signals of different wavelengths may be coupled through connectors at the end of first set of pigtail fibers 11 into first WDM filter 12, which subsequently combines the multiple optical signals into a single composite WDM optical signal. The combined composite WDM signal may be coupled to second WDM filter 18, through optical signal path 15, and be subsequently divided into individual optical signals of their original distinct wavelengths. The signals are then distributed via second set of pigtail fibers 19 and connectors at the ends thereof to their corresponding optical transponders at bay 220. According to one embodiment, optical signal interconnect between the first and second bay 210 and 220 may be bidirectional. In other words, optical signals may propagate from first bay 210 towards second bay 220, or vise versus. According to another embodiment, some optical signals inside optical interconnect apparatus 10 may travel from bay 210 to bay 220, while some other optical signals may travel from bay 220 toward bay 210 simultaneously.

Figure 10:
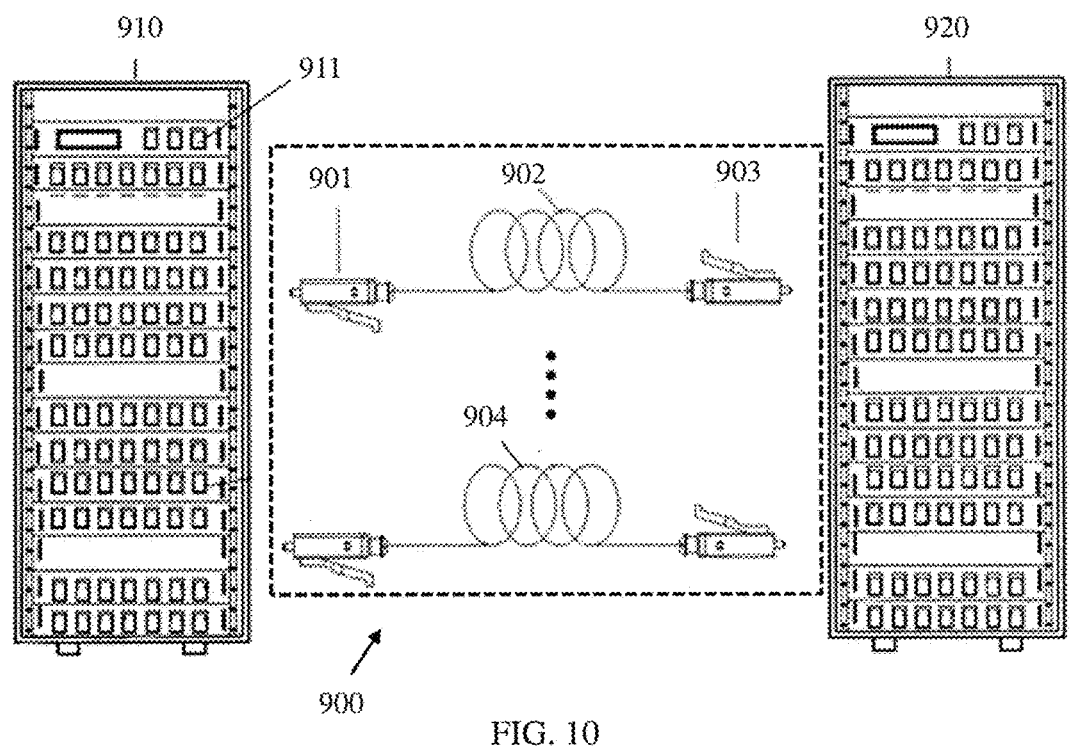
FIG. 10 is a demonstrative illustration of an interconnected optical system where optical signal interconnect among various optical terminals are provided by multiple individual fibers as is known in the art.
Figure 11:
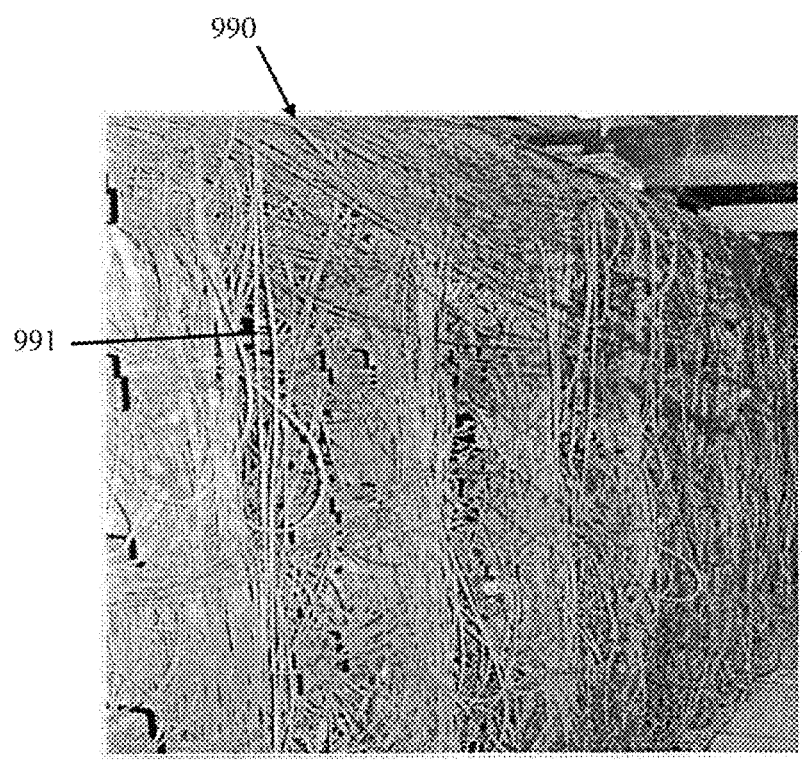
FIG. 11 is a picture of a typical operational optical system where interconnection is provided by a stack of individual fibers at the backside of the bays.

By comparing with current optical signal interconnect arrangement, as being illustrated in FIGS. 10 and 11, where each piece of optical fiber provides interconnect for only one optical signal of one wavelength, embodiment of present invention provides an optical interconnect apparatus that enables interconnect for multiple, for example, 4, 8, or even more optical signals with only one optical signal path such as one optical fiber. The use of optical interconnect apparatus 10 provided by embodiment of present invention greatly reduces the number of individual piece of fibers needed in the optical signal interconnect, illustrated in FIG. 2 by the intentionally missed use of "dots" as compared to that in a conventional interconnected system shown in FIG. 10, saves cost associated with the fibers, increases the reliability control of optical system 200, and eases the complexity in the event of troubleshooting.

According to one embodiment of present invention, optical interconnect apparatus 10 may be made sufficiently compact so as to fit into an increasingly crowded space between bays that are interconnected, or within an individual bay within which there is normally not enough space to accommodate a large number of interconnecting fibers. For example, WDM filter 12 of optical interconnect apparatus 10 may be made both compact and light weight by using most recent technology including thin-film based WDM filters, such as using WDM filter 130 module demonstratively illustrated in FIG. 8.

Figure 8:
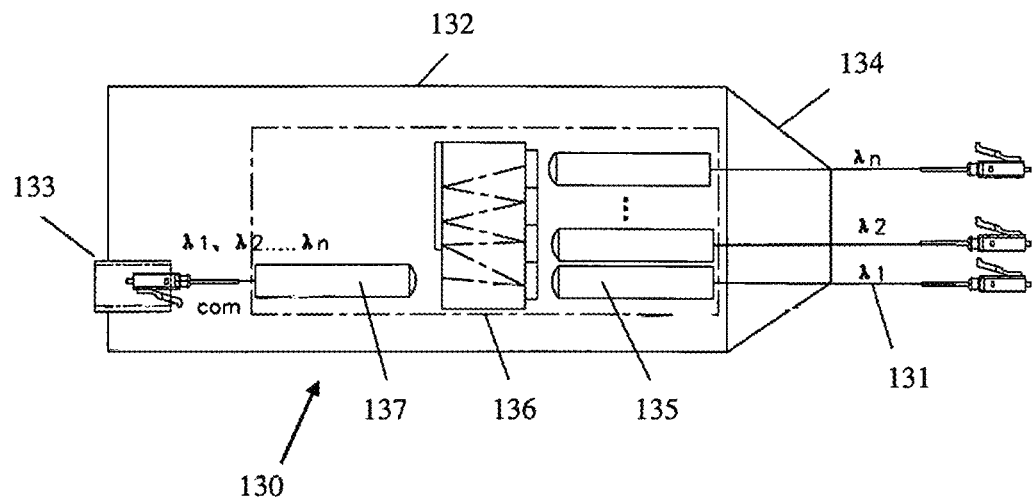
FIG. 8 is a sample example of a WDM filter that maybe used in an optical interconnect apparatus or optical assembly illustrated in FIGS. 3-7.

Reference is briefly made to FIG. 8, which illustrates a sample example of a WDM filter module that may be used in an optical interconnect apparatus or optical assembly, like optical interconnect apparatus 10 in FIG. 1, according to one embodiment of present invention. In FIG. 8, thin-film based WDM filter module 130 is demonstratively illustrated to have an input/output port 133 with a built-in adaptor able to accept an input/output connector, although input/output port 133 may be made in a form of pigtail fiber as well. A composite optical signal coming from port 133 may be coupled into thin-film filter 136 via a collimator 137. Optical signals of different wavelengths may be coupled into a set of collimators 135 at one end, which has a set of corresponding pigtail fibers 131 attached thereto at their respective other end. A semi-flexible protective sleeve 134 may be used to cover the pigtail end to provide additional cushion and flexibility to the set of pigtail fibers 131.

Thin-film filter 136 inside WDM filter module 130 may be made by stacking a plurality of individual single wavelength filters together through optical bonding, the making of which is described in more details in Applicant's Jun. 16, 2017 filed U.S. patent application Ser. No. 15/731,480, the content of which is hereby incorporated by reference in its entirety.

Figure 9:
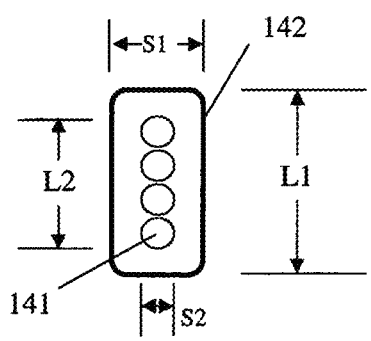
FIG. 9 is a simplified cross-sectional view of a WDM filter showing its cross-sectional dimension relative to that of a set of pigtail fibers attached thereto.

In making a WDM filter module such as WDM filter 12 in FIG. 1, according to one embodiment of present invention, the set of pigtail fibers 11 may be compactly stacked together and attached to WDM filter 12. FIG. 9 is a simplified illustration of a cross-sectional view that demonstrates the relative size of the stack of pigtail fibers and that of the package size of WDM filter 12. According to one embodiment, in order to accommodate tight space commonly found between interconnected bays, WDM filter 12 may be made to have a cross-sectional size, L1×S1 as shown in FIG. 9, that is no larger than 10 times, preferably less than 7 times and more preferably less than 4 times, the size of cross-section of the stack of pigtail fibers 11, L2×S2 as shown in FIG. 9. In one embodiment, as a non-limiting example, a WDM filter with four pigtail fibers may be made to have L1 about 15 mm or less and S1 about 10 mm or less, while L2 about 8 mm or less and S2 about 2 mm or less, making cross-section of the WDM filter less than 10 times of that of the stack of fibers, in a direction vertical to the stacking.

In another embodiment, WDM filter 12 and the set of pigtail fibers 11 may together have a weight less than a predetermined amount such that, for example, when hanging from optical signal path 15, a total weight of WDM filter 12 and associated set of pigtail fibers 11 may not exert a tensile stress to optical signal path 15, which is usually a fiber, that is measurable to cause distortion and/or delay of optical signal that may propagate inside optical signal path 15.

The above weight and size of optical interconnect apparatus 11, in particular that of the WDM filter and associated pigtail fibers made according to embodiment of present invention, enables the optical interconnect apparatus of present invention to fit into limited spaces. For example, optical interconnect apparatus 10 may simply hang over a wall instead of being placed in a shelf to occupy a certain amount of shelf space. In the meantime, the length of each pigtail fibers may be made sufficiently long, but not excessively to save cost and space, to reach each connecting transponders in the shelfs.

Figure 3:
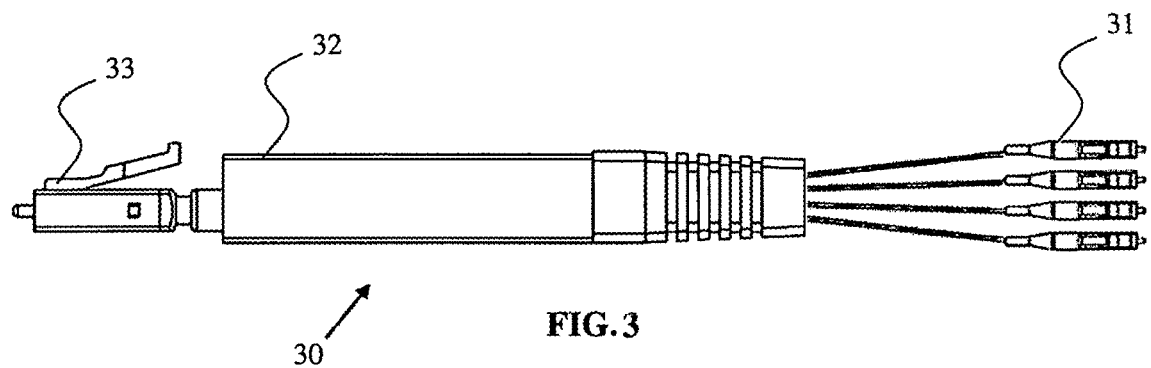
FIGS. 3-7 are demonstrative illustrations of optical assemblies or interconnect kits with different input/output interfaces according to various embodiment of present invention.

Reference is made back to FIG. 3 and subsequent figures. FIGS. 3-7 are demonstrative illustrations of optical interconnect apparatus or optical assemblies with different input/output interfaces according to embodiment of present invention. For example, FIG. 3 demonstratively illustrates an optical assembly 30, or interconnect kit, that includes a set of pigtail fibers 31 coming out of a WDM filter 32. The other end of WDM filter 32 may include an optical connector 33 of any suitable type, e.g., a LC-type connector. Optical assembly or interconnect kit 30 may become a part of optical interconnect apparatus 11 illustrated in FIG. 1. For example, first end 13 of optical signal path 15 of FIG. 1 may be connected to WDM filter 32 via connector 33 through the use of a suitable adaptor.

Figure 4:
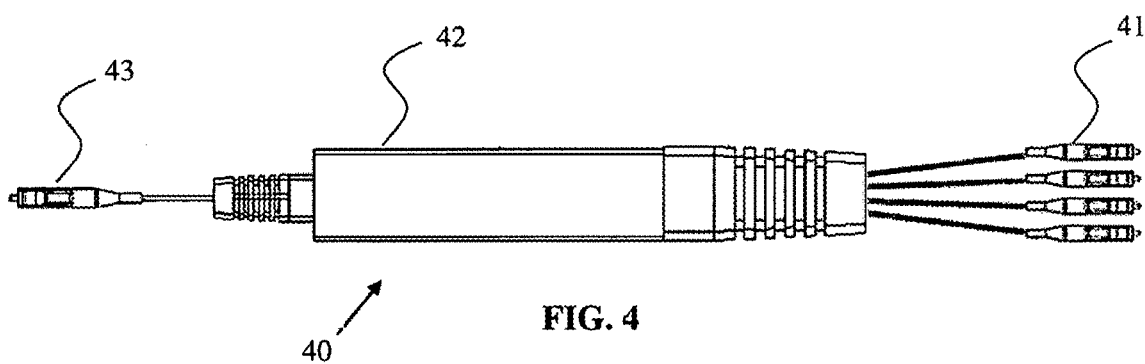

Further for example, FIG. 4 demonstratively illustrates another optical assembly 40, or interconnect kit, that is generally similar to optical assembly 30 illustrated in FIG. 3, including having a set of pigtail fibers 41 coming out of WDM filter 42. On the other hand, optical assembly 40 may have an optical connector 43 that is at the end of a pigtail fiber pigtailed to WDM filter 42, other than being made as part of WDM filter 42 like connector 33 being directly attached to or extended from WDM filter 32 as in FIG. 3.

Figure 5:
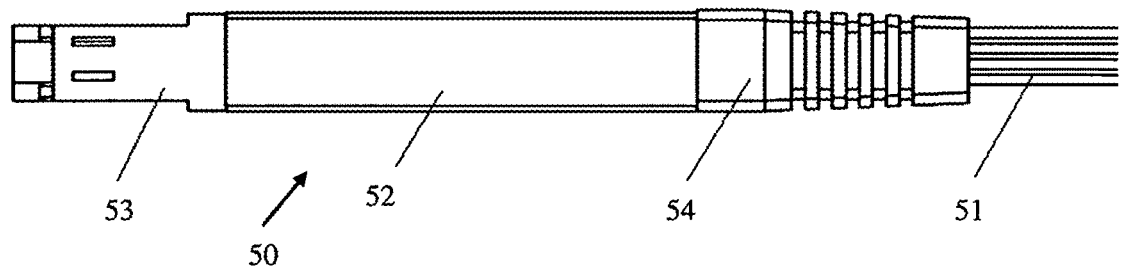

FIG. 5 demonstratively illustrates yet another optical assembly 50, or interconnect kit, that is generally similar to optical assembly or interconnect kit 30 in FIG. 3, including having a set of pigtail fibers 51 coming out of a WDM filter 52. On the other hand, optical assembly 50 may include a female adaptor 53 directly attached to WDM filter 52, instead of a male connector 33 directly attached to WDM filter 32 as in FIG. 3. Depending on the type of adaptors, female adaptor 53 may directly accept a male LC-type connector (or any other types of connectors) for interconnecting optical signals without going through an external adaptor, as it would be for connectors 33 and 43 in FIG. 3 and FIG. 4. Optical assembly 50 may also include a semiflexible sleeve 54 between the set of pigtail fibers 51 and WDM filter 52, similar to optical assemblies 30 and 40 although not specifically described, which provides mechanical protection and ease of handling of optical assembly 50.

Figure 6:
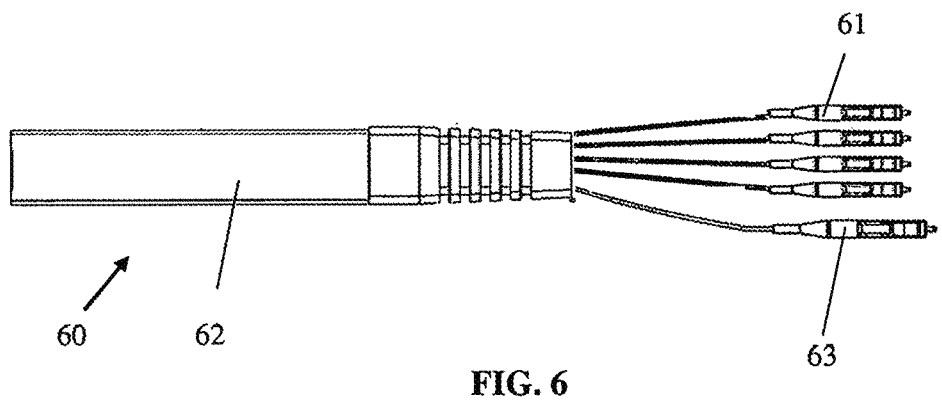

FIG. 6 demonstratively illustrates an optical assembly 60, or interconnect kit, that is similar to optical assembly 40 in FIG. 4, including having a set of pigtail fibers 61 coming out of WDM filter 62. Different from input/output port 43 in optical assembly 40 in FIG. 4, input/output port 63 of optical assembly 60 may be located on a same side as that of the set of pigtail fibers 61. The flexibility of locations of input/output port and the set of pigtail fibers further enhances the usability of optical assembly 60 in space-tight environment.

Figure 7:
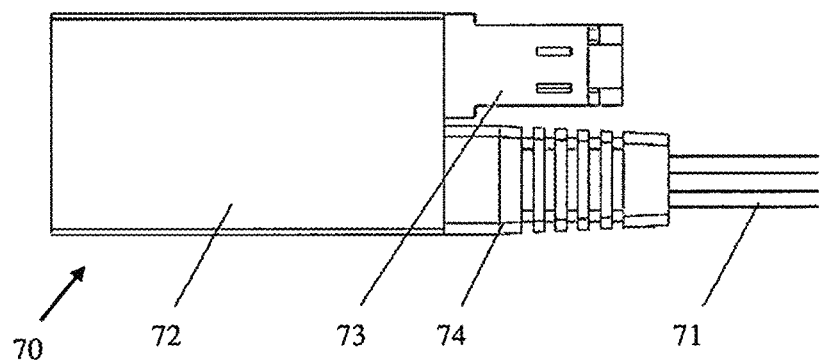

FIG. 7 demonstratively illustrates an optical assembly 70, or interconnect kit, that is similar to optical assembly 50 in FIG. 5, including having a set of pigtail fibers 71 coming out of WDM filter 72. Different from female adaptor 53 in optical assembly 50 in FIG. 5, a female adaptor 73 for input/output of optical assembly 70 may be located on a same side as that of the set of pigtail fibers 71 and is directly attached to WDM filter 72. Therefore, similar to optical assembly 60 where both the input/output port and the set of pigtail fibers are also located on a same side of the optical assembly, the flexibility of locations of input/output port (i.e., female adaptor 73) and the set of pigtail fibers further enhances the usability of optical assembly 70 in space-tight environment.

One or more optical assemblies or interconnect kits 30, 40, 50, 60, and 70, as demonstratively illustrated above in FIGS. 3-7, may be used in connection with optical signal path 15 of optical interconnect apparatus 10 in providing alternative interconnect apparatus for optical signals. For example, first set of pigtail fibers 11 and first WDM filter 12 (and/or second set of pigtail fibers 19 and second WDM filter 18) may be replaced by one or more of above optical assemblies or interconnect kits in optical interconnect apparatus 10.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. An optical interconnect apparatus comprising: an optical signal path having a first and a second end and having only one optical path connecting the first and second ends; a first wavelength-division-multiplexing (WDM) filter having a first end of two or more input ports and a second end of a single output port; a second WDM filter having a first end of a single input port and a second end of two or more output ports; and a first set of two or more pigtail fibers attached to the two or more input ports of the first end of the first WDM filter, the single output port of the second end of the first WDM filter attached to the first end of the optical signal path, the second end of the optical signal path attached to the single input port of the first end of the second WDM filter, and the two or more output ports of the second end of the second WDM filter attached to a second set of two or more pigtail fibers, wherein two or more optical signals are adapted to propagate from the first set of two or more pigtail fibers into the first end of the first WDM filter, to propagate subsequently from the second end of the first WDM filter into the first end of the optical signal path, to propagate subsequently from the second end of the optical signal path into the first end of the second WDM filter, and to propagate subsequently from the second end of the second WDM filter into the second set of two or more pigtail fibers; wherein said a optical signal path is an optical fiber and wherein said first WDM filter and a first set of fibers have a combined weight that is enabled by the use of stacked thin-film filters such that, when the apparatus is hung from said optical fiber, said combined weight is sufficiently light to not exert a tensile stress to cause measurable distortion and delay of optical signals that propagate inside said optical fiber.

2. The apparatus of claim 1, wherein at least one of said first and second ends of said optical signal path is connected to one of corresponding said first and second WDM filters through an optical adaptor, and wherein said first WDM filter has a cross-sectional area that is less than ten times a size of the first set of two or more pintail fibers being stacked together, in a direction vertical to the stacking.

3. The apparatus of claim 1, wherein at least one of said first and second ends of said optical signal path is pigtailed from one of corresponding said first and second WDM filters, wherein said first and second WDM filters have wavelength-dependent functionalities that are matched to each other.

4. The apparatus of claim 1, wherein said first set of pigtail fibers comprises at least 4 individual pigtail fibers that are adapted to accommodate four optical signals of four different wavelengths respectively, and wherein an optical signal of a first wavelength propagates from a corresponding first pigtail fiber to the first end of the first WDM filter; continues to the second end of the first WDM filter; and continues to the first end of the optical signal path, and the optical signal of the first wavelength experiences a total insertion loss of less than 0.5 dB from the first pigtail fiber to the first end of the optical signal path.

5. The apparatus of claim 1, wherein said first set of pigtail fibers are stacked together and mounted on one side of said first WDM filter.

6. The apparatus of claim 5, wherein said first set of pigtail fibers and said first end of said optical signal path are at a same side of said first WDM filter.

7. An optical assembly comprising: a wavelength-division-multiplexing (WDM) filter having a first end of a set of input ports and a second end of a single output port; and a set of pigtail fibers attached to said set of input ports of said first end of the WDM filter, wherein the set of pigtail fibers are compactly stacked together and mounted on one side of the WDM filter that, in a direction vertical to said set of pigtail fibers, has a cross-sectional area less than ten times of a size of the stacked set of pigtail fibers, and wherein a set of optical signals of different wavelengths are adapted to travel from said set of pigtail fibers to said first end of said WDM filter via said set of input ports thereof, to travel subsequently to said second end of said WDM filter, and to travel subsequently to an optical signal path of a single fiber that is connected to said single output port of said second end of said WDM filter; wherein the WDM filter is a thin-film based WDM filter made of a plurality of compactly stacked individual single wavelength thin-film filters that creates a combined weight of the WDM filter and a set of four pigtail fibers that is sufficiently light, when the optical assembly is hung from the optical signal path, to not exert a tensile stress to cause measurable distortion and delay of optical signals that propagate inside said optical signal/path.

8. The optical assembly of claim 7, wherein said WDM filter further includes a single-width female optical adaptor at said single output port for accommodating a connectorized optical fiber to pass said set of optical signals of different wavelengths.

9. The optical assembly of claim 7, wherein said WDM filter further includes another pigtail fiber that is connectorized and connected to, via an adaptor suitable for MT-RJ type connector, an optical fiber of the optical signal path.

10. The optical assembly of claim 7, wherein said WDM filter is a first WDM filter and said set of pigtail fibers is a first set of pigtail fibers, further comprising:
an optical signal path with a first end thereof being attached to said first set of pigtail fibers via said first WDM filter;
a second WDM filter; and
a second set of pigtail fibers being attached to a second end of said optical signal path via said second WDM filter,
wherein at least one of said first and second WDM filters comprises a set of different thin-film filters each of which being made for an optical signal of different wavelength.

11. An interconnected optical system comprising: a first optical transport terminal having a first set of optical transponders with a first set of corresponding optical signal ports; a second optical transport terminal having a second set of optical transponders with a second set of corresponding optical signal ports; and an optical signal path connecting said first set of optical signal ports with said second set of optical signal ports, wherein said first set of optical signal ports are connected to a first set of pigtail fibers that are attached to a first end of a first wavelength-division-multiplexing (WDM) filter, a second end of said first WDM filter being connected to a first end of said optical signal path; and wherein said second set of optical signal ports are connected to a second set of pigtail fibers that are attached to a first end of a second WDM filter, a second end of said second WDM filter being connected to a second end of said optical signal path, and wherein an optical signal, from said first optical transport terminal, is adapted to travel from said first set of pigtail fibers to said first end of said first WDM filter, to travel subsequently to said second end of said first WDM filter and subsequently to said first end of said optical signal path, to travel subsequently to said second end of said optical signal path and subsequently to said second end of said second WDM filter, to travel subsequently to said first end of said second WDM filter, to travel subsequently to said second set of pigtail fibers, and to travel and reach said second optical transport terminal; wherein at least one of said first and second WDM filters is a thin-film based WDM filter comprising a plurality of individual thin-film filters, each of which filtering a different wavelength of optical signal, the plurality of individual thin-film filters are compactly stacked one on top of another sequentially using optical bonding, the use of thin-film filters and their sequential stacking enables the WDM filter to have a cross-sectional area of equal to or less than 15 mm-by-10-mm, a total optical/insertion loss of less than 0.5 dB, and a combined weight that is sufficiently light to not exert tensile stress to a fiber, when being hung from the fiber, that may cause measurable distortion and delay of optical signals that propagate inside said fiber.

12. The optical system of claim 11, wherein said first end of said optical signal path is connected to said first WDM filter via a pigtail fiber or is connected to said first WDM filter through a SC connector via an optical adaptor of single-width female type.

13. The apparatus of claim 1, wherein the second WDM filter is a thin-film based WDM filter made of a plurality of individual thin-film filters each being made for filtering a different wavelength, the thin-film based WDM filter receives a composite signal of the two or more optical signals and separates them into said second set of two or more pigtail fibers, and wherein optical bonding is used to stack together said individual thin-film filters one on top of another compactly.

14. The apparatus of claim 1, wherein the first WDM filter is a thin-film based WDM filter and wherein an optical signal propagating from one of said first set of two or more pigtail fibers to said first end of said optical signal path through said thin-film based WDM filter experiences less than 0.5 dB total insertion loss associated with said thin-film based WDM filter.

15. The optical assembly of claim 7, wherein the WDM filter is a thin-film based WDM filter comprising a plurality of individual thin-film filters each for filtering an optical signal of different wavelength, the individual thin-film filters are compactly stacked together one on top of another through optical bonding, the use of compactly stacked thin-film filters enables the WDM filter, when having four pigtail fibers, to have a cross-sectional area of equal to or less than 15 mm-by-10 mm.

16. The optical assembly of claim 7, wherein the thin-film based WDM filter enables a total insertion loss of said set of optical signals less than 0.5 dB.

17. The optical system of claim 11, wherein the second end of the first WDM filter is connectorized and connected to, via an adaptor suitable for MT-RJ type connector, the first end of the optical signal path.

* * * * *